United States Patent [19]

Kelf

[11] 4,015,715
[45] Apr. 5, 1977

[54] STABLE PLATFORM SHIPPING CONTAINER

[75] Inventor: Michael A. Kelf, Bremerton, Wash.
[73] Assignee: The United States of America as represented by the Secretary of the Navy, Washington, D.C.
[22] Filed: Jan. 23, 1974
[21] Appl. No.: 436,004
[52] U.S. Cl. .............................. 206/521; 206/386; 248/18; 248/23
[51] Int. Cl.² .................. B65D 81/02; F16F 15/00
[58] Field of Search .................. 206/386, 521, 522; 248/18, 20–23; 220/1.5

[56] References Cited

UNITED STATES PATENTS

| 2,469,156 | 5/1949 | Gargill | 206/523 |
| 2,588,732 | 3/1952 | Kemp, Jr. | 206/386 |
| 2,685,964 | 8/1954 | Brown | 206/521 |
| 2,700,458 | 1/1955 | Brown | 206/521 |
| 2,799,778 | 7/1957 | Stephenson | 206/521 |
| 2,817,435 | 12/1957 | Butterfield | 206/521 |
| 2,956,761 | 10/1960 | Weber | 248/23 |
| 2,957,331 | 10/1960 | Bruckman | 248/22 |
| 3,003,656 | 10/1961 | Hardigg | 206/523 |
| 3,275,131 | 9/1966 | Erickson | 206/523 |
| 3,509,742 | 5/1970 | Bauer | 248/21 |
| 3,794,277 | 2/1974 | Smedley et al. | 248/20 |

Primary Examiner—George E. Lowrance
Assistant Examiner—Douglas B. Farrow
Attorney, Agent, or Firm—R. S. Sciascia; Charles D. B. Curry

[57] ABSTRACT

A shipping container including a cover and a base wherein the base includes a support platform that is supported on its corners by four pneumatic springs. The pneumatic springs are mounted at an angle to provide three-dimensional shock and vibration isolation of the platform. The platform is tuned and is selected to have a predetermined weight to provide vibration isolation for shipped objects having a weight range of from about zero to a predetermined maximum weight. An air accumulator and manifold are employed in cooperation with the pneumatic springs to provide the desired pneumatic spring characteristic such as reduced stiffness and reduced natural frequency.

2 Claims, 7 Drawing Figures

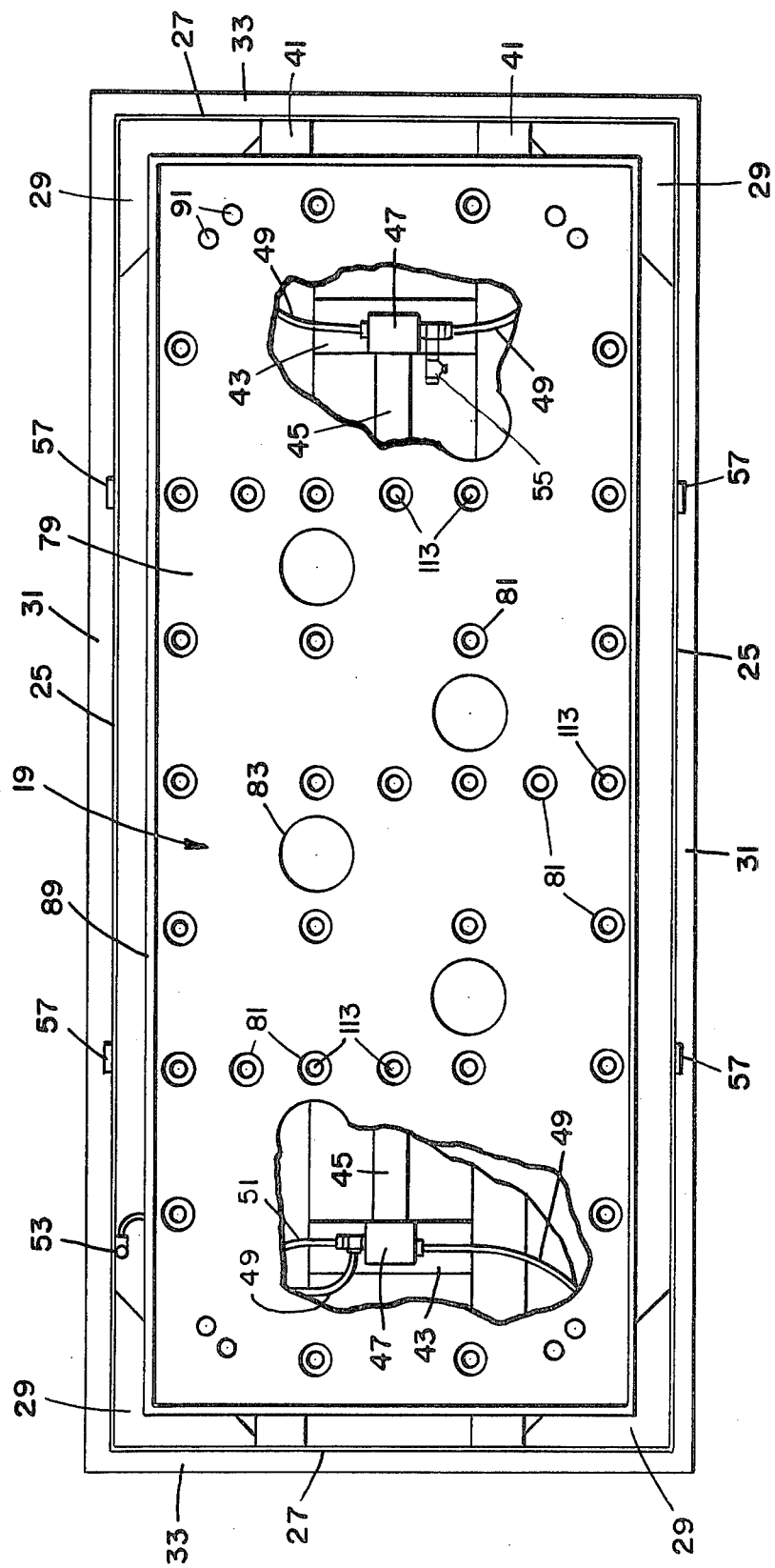
FIG_2

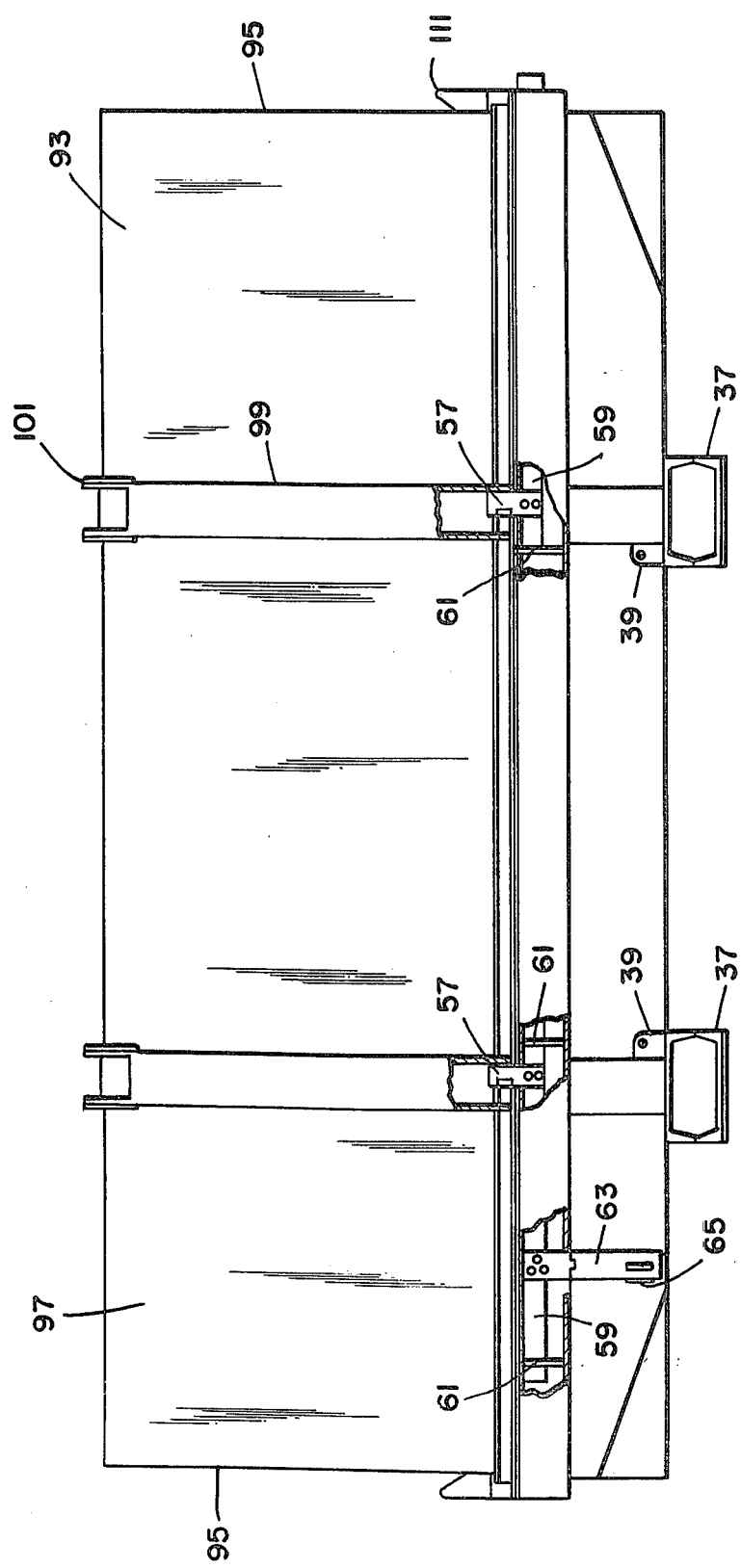
FIG_3

U.S. Patent    April 5, 1977    Sheet 4 of 4    4,015,715
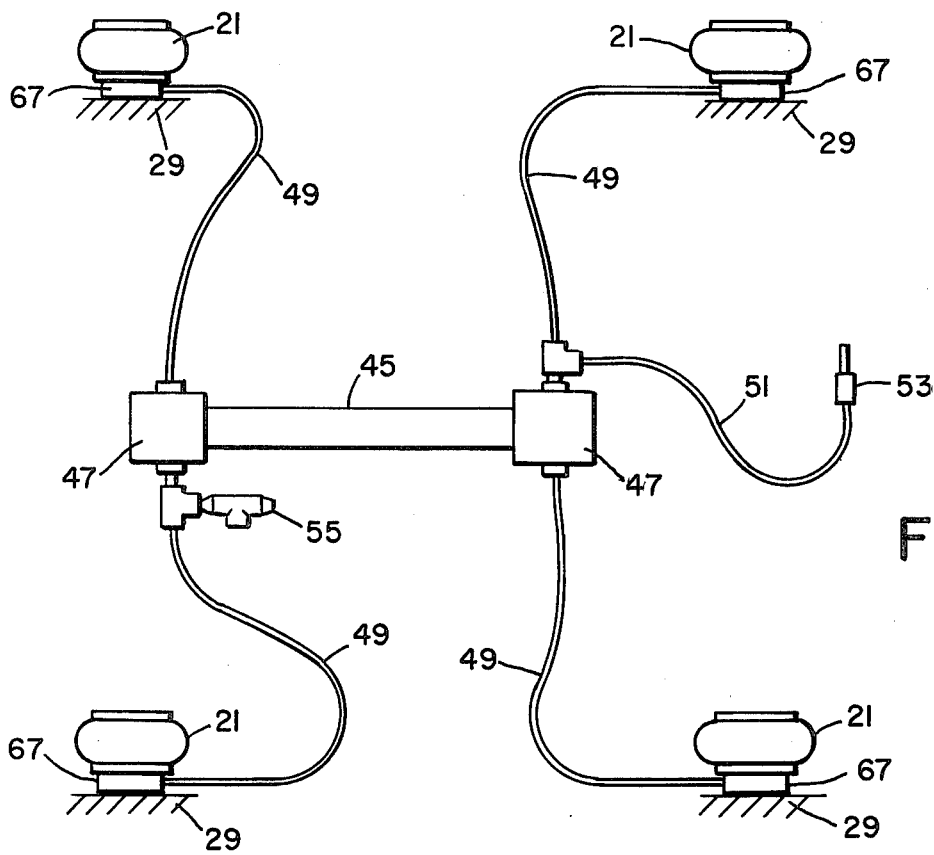
FIG_4
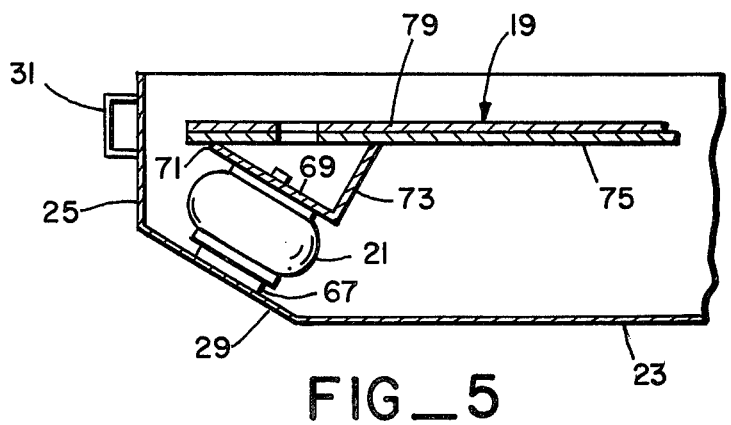
FIG_5
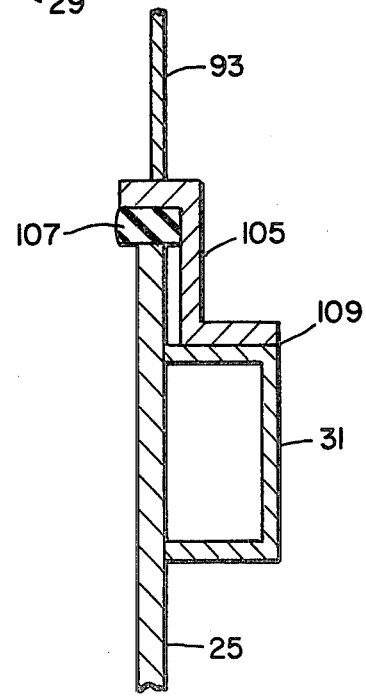
FIG_7
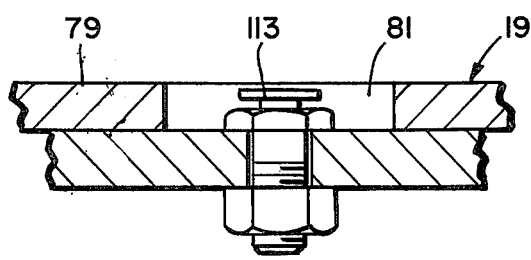
FIG_6

STABLE PLATFORM SHIPPING CONTAINER

BACKGROUND OF THE INVENTION

1. Field of the Invention

The present invention relates to a shipping container and more particularly to a shipping container that employs pneumatic springs and a tuned platform.

2. Description of the Prior Art

Prior shipping containers have not been able to provide shock and vibration protection for a wide range of cargo weights. The shipping container of the present invention was developed to provide protection from shock, vibration, and weather for fragile cargo during shipment by trick, rail, ship, or aircraft. Shock and vibration isolation is accomplished through use of pneumatic suspension and weather protection is facilitated by complete enclosure of the cargo. In particular, the shipping container was developed to protect fragile electronic equipment during shipment. Previously, such equipment suffered costly shipping damage since an adequate transportation container was not available. In accordance with the present invention the incorporation of pneumatic springs and a tuned platform to provide optimum shock and vibration response of cargo offers greatly improved cargo protection over previous methods of shipping.

SUMMARY OF THE INVENTION

Briefly, the present invention relates to a shipping container including a cover and a base wherein the base includes a support platform that is supported on its corners by four pneumatic springs. The pneumatic springs are mounted at an angle to provide three-dimensional shock and vibration isolation of the platform. The platform is tuned and is selected to have a predetermined weight to provide vibration isolation for shipped objects having a weight range of from about zero to a predetermined maximum weight. An air accumulator and manifold are employed in cooperation with the pneumatic springs to provide the desired pneumatic spring characteristic such as reduced stiffness and reduced natural frequency.

STATEMENT OF THE OBJECTS OF THE INVENTION

An object of the present invention is to provide a shipping container;

Another object of the present invention is to provide a shipping container that isolates its cargo from shock and vibrations;

Still another object of the present invention is to provide a shipping container that has a pneumatic spring mounted support platform;

A further object of the present invention is to provide a shipping container that has a tuned support platform.

Other objects, advantages and novel features of the present invention will become apparent from the following detailed description of the invention when considered in conjunction with the accompanying drawings wherein:

BRIEF DESCRIPTION OF THE DRAWINGS

FIG. 2 is a top elevation of the base of the shipping container of the present invention;

FIG. 3 is a side elevation of the shipping container of the present invention;

FIG. 4 is a schematic diagram of the pneumatic springs and the accumulation employed in the shipping container of the present invention;

FIG. 5 is a schematic diagram of the corner mounted pneumatic spring of the shipping container of the present invention;

FIG. 6 is an enlarged sectional view of the platform employed in the shipping container of the present invention; and FIG. 7 is an enlarged sectional view of the shipping container cover and base.

DESCRIPTION OF THE PREFERRED EMBODIMENT

Figure 1:
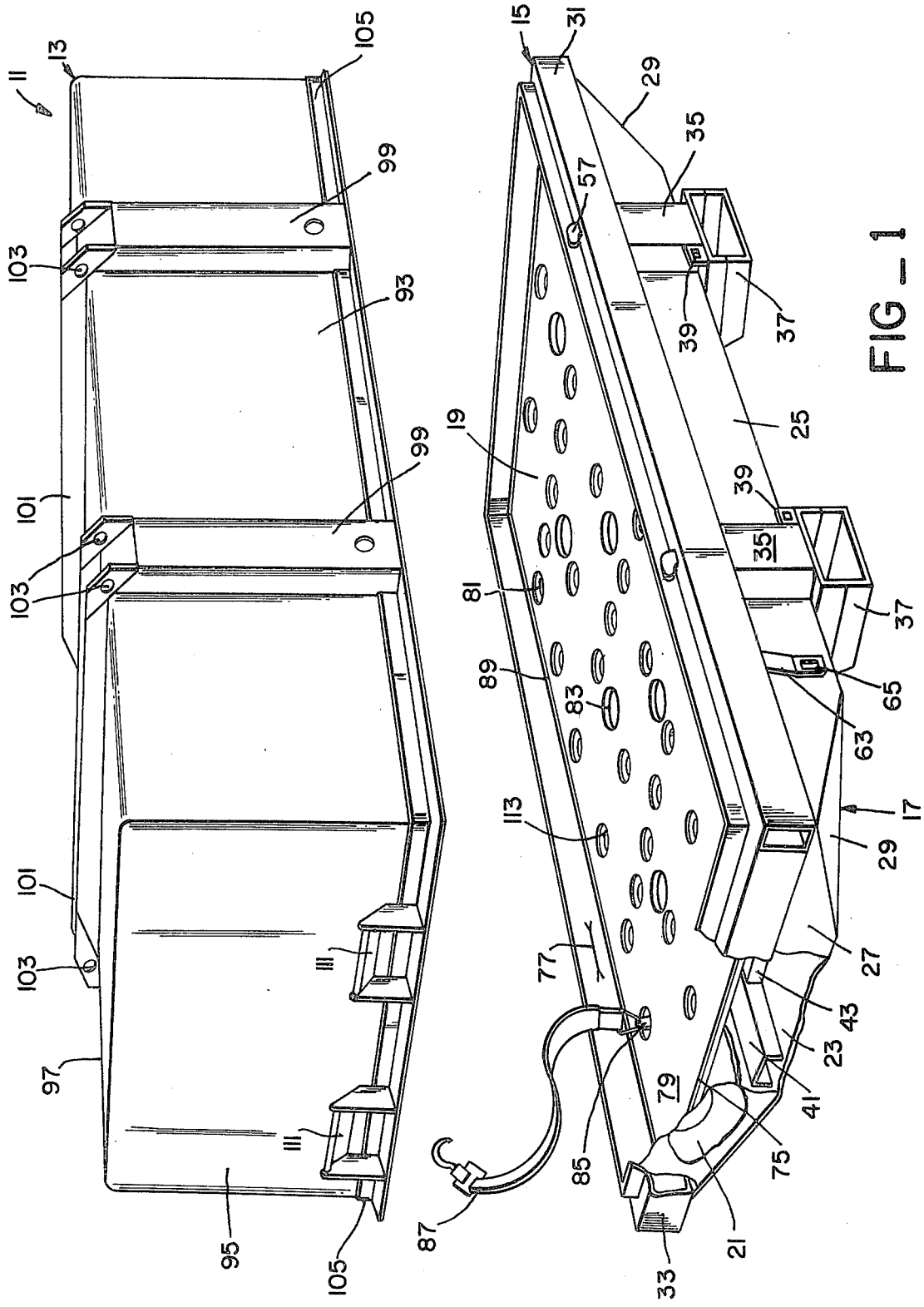
FIG. 1 is a pictorial view of the shipping container of the present invention.

Referring to FIG. 1, shipping container 11 includes a cover 13 and a container base 15. Container base 15 includes a bottom section 17 and a support platform 19. Support platform 19 is suspended in spaced relationship from bottom section 17 by means of four pneumatic springs 21 which are positioned in each of the four corners of bottom section 17. Important features of the present invention reside in the platform weight and the beveled positioning of pneumatic springs 21 to provide three-dimensional shock and vibration isolation of the platform 19. This and other aspects of the invention will be hereinafter described in detail.

Bottom section 17 is made of solid construction and includes bottom 23, sides 25, ends 27 and beveled corners 29. Side support members 31 are attached to the upper exterior surface of sides 25, by welding or the like. End support members 33 are attached to the upper exterior surface of ends 27, by welding or the like. Vertical support members 35 are attached to the lower exterior surface of sides 25, by welding or the like. Bottom support member 37 is attached to the exterior surface of bottom 23. Bottom supports 37 are hollow to provide a receptacle for a fork lift or the like. Lifting members 39 are provided to allow hoisting by a crane or the like. Longitudinal members 41 are attached to the interior surface of bottom 23. It should be particularly noted that pneumatic springs 21 are supported by bottom support members 37 through the cantilevered sections of bottom 23, sides 25, side support members 31 and longitudinal members 41.

Referring to FIGS. 2 and 4, accumulator mounts 43 are attached to the interior surface of bottom 23 and are used to support the pneumatic accumulator 45 and manifold 47. A plurality of flexible hoses 49 is connected between the manifolds 47 and pneumatic springs 21. Connected to one manifold 47 is flexible hose 51 which is also connected to air filling valve 53. A pressure relief valve 55 is connected to one of the manifolds 47. It should be noted that accumulator 45 functions to lower the natural frequency of the pneumatically-suspended platform 19.

The operation of a pneumatic spring system and accumulator is as follows: The stiffness of a simple, single-acting pneumatic spring is derived from the gas laws governing the pressure-volume relationship. In particular, for adiabatic compression $$PV^m = P_r V_r^m$$

where $P$ is the gas pressure corresponding to some spring volume $V$, $P_r$ and $V_r$ are reference pressure and volume respectively, and $m$ is a gas constant taken as 1.4 for air. Assuming a relatively constant spring cross-sectional area A and defining the load on the spring as F, then $$(F/A)V^m = P_r V_r^m$$

and $$V = V_4 - \Delta V.$$

Then, the pneumatic spring constant $K$ is $$K = \frac{mP_r A^2}{V_r} \left( \frac{1}{1 - \frac{\Delta V}{V_r}} \right) m + i$$

Let $V_r$ and $P_r$ be the equilibrium spring volume and pressure respectively; then, if the spring volume $V_r$ is made large such that $V_r >> \Delta V$.

$$K = \frac{mP_r A^2}{V_r}$$

Therefore, it can be seen that increasing the equilibrium volume $V_r$, as can be done by adding an accumulator, the spring constant $K$ can be lowered, thereby providing a more complaint (softer) spring. Furthermore, if it is noted that the natural vibration frequency $f$ of a system of mass M and stiffness (spring constant) $K$ is given by $$f = \frac{1}{2\pi} \sqrt{\frac{K}{M}}$$

then, it can be seen that reduction of stiffness (as achieved by addition of an accumulator to a pneumatic spring) reduces the natural system frequency thereby reducing force (and shock) tranmissibility.

In addition to reducing force transmissibility, implementation of an accumulator of volume $V_t$ attached to a pneumatic spring of volume $V_r$ by a hose of diameter $d$ and length $l$ provides system damping of ratio $\xi$, expressed by $$\epsilon = \frac{6\mu V_t l}{md^4 P_r} \sqrt{\frac{K}{M}}$$

Where $\mu$ is the dynamic viscosity of the gas and K and M are the stiffness and mass respectively as previously defined. It can be seen that system damping can be increased by increasing the accumulator volume $V_t$, increasing the hose length $l$, and/or by decreasing the hose diameter $d$. Practical limitations, of course, restrict these size variations.

Increased system damping can provide improved dynamic characteristics of the system and thereby reduce dynamic force transmissibility. Therefore, as shown by the foregoing discussion, addition of an accumulator can allow tuning of a pneumatic spring system to achieve optimum dynamic response characteristics.

Referring to FIGS. 2 and 3 the latching system of the shipping container 11 includes two pairs of latch dogs 57 which are respectively attached to a pair of latch bars 59. As best depicted in FIG. 3 the latch bars 59 are slidably supported by slide members 61 located within side support members 31. Each latch bar may be slidably actuated by raising hasp 63 from its latch 65 and by moving the hasp to the right as shown in FIG. 3. The latch dogs 57 are in the latched position when the latch bar 59 is moved to the left as shown in FIG. 1.

Referring to FIGS. 1 and 5 the support platform 19 is mounted on its four corners respectively by four pneumatic springs 21. The pneumatic springs 21 are mounted on the interior surface of beveled corners 29 which are beveled at about a 30° angle with respect to horizontal or bottom 23. The lower surface of pneumatic spring 21 is supported by and attached to riser 67 by bolting or the like. The upper surface of the pneumatic spring 21 rests against and is attached to leg 69 of spring mount 71 by bolting or the like. The upper edges of legs 69 and 73 of spring mount 71 are attached to the lower surface of platform 19 by welding or the like.

Referring to FIGS. 1, 2, 5 and 6 platform 19 comprised plate 75 which may be made of steel, for example, and preferably weighs about 800 pounds. This steel plate 75 provides an inertially stable base for the support system. That is, if a light platform were used and a light object were placed on the platform, then to have an inertially stable system the spring would have to be very complaint or weak. With this type of system it would be impossible to support a heavy object, since to do so would require an excessively long spring. Therefore, the pneumatic spring 21 of the present invention is selected to provide optimum shock and vibration damping or attenuation for weight between about 800 pounds (the weight of platform 19) and about 1600 pounds. By maintaining the pressure within the pneumatic spring to keep the platform 19 at the load line 77 of FIG. 1 the optimum damping characteristics are obtained throughout the load range.

Mounted on top of plate 75 is a floor 79 which is preferably made of wood or other semi-elastic material. Floor 79 includes a plurality of small openings 81 and several large openings 83. Large openings 83 are in alignment with similar openings in plate 75 to provide access to the interior of container base 15. Small openings are arranged in rows and have lugs 113 that are bolted through the plate 75. As best depicted in FIG. 6, the upper surfaces of lugs 113 are below the upper surface of floor 79. Therefore, floor 79 is smooth and cargo can be readily slid or otherwise moved across the surface. The function of lugs 113 is to provide stable fastening points for the fasteners 85 at the ends of cargo retaining straps 87. A lip 89 is provided around the periphery of floor 79. Holes 91, as shown in FIG. 2, allow access to the mounting screws of the pneumatic springs 21.

Cover 13 includes sides 93, ends 95 and top 97. Vertical supports 99 and horizontal supports 101 are U-shaped channels into which tie down cables may be placed. Openings 103 are provided for lifting of the cover 13. As best depicted in FIGS. 1 and 7, attached to the bottom periphery of cover 13 is Z-section member 105. Around the periphery of the upper interior surface of member 105 is attached, by gluing or the like, a gasket 107 made of elastomeric material to provide a weather-resistant seal. When the cover is set into position the lower surface 109 of member 105 rests against the upper surface of side support members 31 to support the cover wherein gasket 107 is somewhat compressed to provide a seal. Attached to the ends of the cover are two pairs of cover lifting handles 111.

In view of the foregoing it can be seen that a unique shipping container is provided that is capable of safely carrying fragile or easily shock damaged cargo. The cargo is preferably held in place by the plurality of straps attached to the platform. In addition this platform is capable of safely handling cargo that is very light to cargo that is very heavy. It would be obvious to one skilled in the art that various features of this shipping container may be modified such as the type of spring, pneumatic or mechanical, and the relative size of the spring and the weight of the platform.

What is claimed is:

1. A shipping container comprising:
   a. a base having a bottom member and four side wall members and four corner sections beveled at about 30° to the bottom member;
   b. a platform;
   c. spring bias means for operably connecting said platform to said base;
   d. said spring bias means comprises four pneumatic springs;
   e. said platform having four corners wherein one pneumatic spring is mounted between each corner and said base to support said platform in compression;
   f. each of said pneumatic springs on one of said beveled corners being mounted with the axis of said spring being about perpendicular to said corner;
   g. said platform has a preselected weight of about 800 pounds wherein said platform and said pneumatic springs are tuned to isolate said platform from shock and vibration when supporting a cargo having a weight range of from about 0 to about 800 pounds;
   h. an air accumulator being operably connected to each of said pneumatic springs;
   i. means for increasing the air pressure in said springs and accumulator with increased cargo weight and for decresing the air pressure in said springs and accumulator with decreased cargo weight;
   j. first and second spaced apart bottom support members being operably connected to the exterior of said bottom member; and
   k. first and second spaced apart longitudinal members being operably connected to the interior of said bottom member and are about perpendicular to said first and second spaced apart bottom support members.

2. A shipping container comprising:
   a. a base having a bottom member and four side wall members and four corner sections beveled at a preselected angle to the bottom member;
   b. a platform;
   c. four pneumatic springs;
   d. said platform having four corners wherein one of said pneumatic springs is mounted between each corner and said base to support said platform in compression;
   e. each of said pneumatic springs on one of said beveled corners being mounted with the axis of said spring being about perpendicular to said corner;
   f. said platform has a preselected weight wherein said platform and said pneumatic springs are tuned to isolate said platform from shock and vibration when supporting a cargo having a weight range of from about 0 to about said preselected weight;
   g. an air accumulator being operably connected to each of said pneumatic springs; and
   h. means for increasing the air pressure in said springs and accumulator with increased cargo weight and for decreasing the air pressure in said springs and accumulator with decreased cargo weight.

* * * * *